(12) United States Patent
Ravendran et al.

(10) Patent No.: US 9,505,902 B2
(45) Date of Patent: Nov. 29, 2016

(54) CERAMIC FILLER, METHOD OF PREPARING THE CERAMIC FILLER AND APPLICATIONS AS RESONATOR AND LAMINATE THEREOF

(71) Applicants: SECRETARY, DEPARTMENT OF ELECTRONICS AND INFORMATION TECHNOLOGY, GOVT OF INDIA, New Delhi (IN); EXECUTIVE DIRECTOR, CENTRE FOR MATERIALS FOR ELECTRONICS TECHNOLOGY (C-MET), Thrissur (IN); SECRETARY, DEPARTMENT OF ATOMIC ENERGY, Mumbai (IN)

(72) Inventors: Ratheesh Ravendran, Thrissur (IN); Stanley Jacob Kollannoor, Thrissur (IN); Kodakattumana Purushothaman Murali, Thrissur (IN); Akhilesh Jain, Indore (IN); Pundlik Rama Hannurkar, Indore (IN)

(73) Assignees: SECRETARY, DEPARTMENT OF ELECTRONICS AND INFORMATION TECHNOLOGY, GOVT OF INDIA, New Delhi (IN); EXECUTIVE DIRECTOR, CENTRE FOR MATERIALS FOR ELECTRONICS TECHNOLOGY (C-MET), Thrissur (IN); SECRETARY, DEPARTMENT OF ATOMIC ENERGY, Mumbai (IN)

( * ) Notice: Subject to any disclaimer, the term of this patent is extended or adjusted under 35 U.S.C. 154(b) by 113 days.

(21) Appl. No.: 14/228,342

(22) Filed: Mar. 28, 2014

(65) Prior Publication Data

US 2015/0274926 A1     Oct. 1, 2015

(51) Int. Cl.
*C08K 3/22* (2006.01)
*C04B 35/495* (2006.01)
(Continued)

(52) U.S. Cl.
CPC ............... *C08K 3/22* (2013.01); *C01G 35/006* (2013.01); *C04B 35/495* (2013.01); *C04B 35/6261* (2013.01); *C04B 35/62675* (2013.01); *C04B 35/634* (2013.01); *C04B 35/64* (2013.01); *C08K 3/24* (2013.01); *C01P 2002/82* (2013.01); *C01P 2004/03* (2013.01); *C01P 2004/61* (2013.01); *C01P 2004/62* (2013.01); *C01P 2006/40* (2013.01); *C04B 2235/3217* (2013.01);
(Continued)

(58) Field of Classification Search
USPC .................................. 524/408, 544; 264/614
See application file for complete search history.

(56) References Cited

U.S. PATENT DOCUMENTS

4,996,097 A    2/1991  Fischer
5,223,568 A    6/1993  Landi et al.
(Continued)

*Primary Examiner* — Peter D Mulcahy
*Assistant Examiner* — Henry Hu
(74) *Attorney, Agent, or Firm* — Hamre, Schumann, Mueller & Larson, P.C.

(57) ABSTRACT

The present disclosure relates to ceramic fillers and methods for preparing said ceramic fillers. The present disclosure further relates to dielectric resonator, fluoropolymer-ceramic filler compositions and their corresponding laminates along with their respective methods for preparing the same from the ceramic fillers. The present disclosure further provides a dielectric resonator and fluoropolymer-ceramic filler laminates having enhanced dielectric properties. The present disclosure also relates to various microwave applications of such fillers, resonators and laminates including microwave devices and circuits.

9 Claims, 4 Drawing Sheets (51) Int. Cl.
 *C04B 35/64* (2006.01)
 *C08K 3/24* (2006.01)
 *C01G 35/00* (2006.01)
 *C04B 35/626* (2006.01)
 *C04B 35/634* (2006.01)

(52) U.S. Cl.
 CPC ............ *C04B2235/3224* (2013.01); *C04B 2235/3225* (2013.01); *C04B 2235/3227* (2013.01); *C04B 2235/3251* (2013.01); *C04B 2235/5436* (2013.01); *C04B 2235/5445* (2013.01); *C04B 2235/6562* (2013.01); *C08K 2003/2227* (2013.01); *Y10T 428/2982* (2015.01)

(56) References Cited

U.S. PATENT DOCUMENTS

| | | | |
|---|---|---|---|
| 5,358,775 A * | 10/1994 | Horn, III | B32B 15/08 |
| | | | 361/750 |
| 5,552,210 A | 9/1996 | Horn, III et al. | |
| 5,739,193 A | 4/1998 | Walpita et al. | |
| 5,965,273 A | 10/1999 | Walpita et al. | |
| 2012/0077095 A1* | 3/2012 | Roumi | H01G 11/02 |
| | | | 429/405 |
| 2012/0171569 A1* | 7/2012 | Jones | C04B 35/62635 |
| | | | 429/213 |
| 2014/0162065 A1* | 6/2014 | Surendran | H01B 3/12 |
| | | | 428/402 |

* cited by examiner

CERAMIC FILLER, METHOD OF PREPARING THE CERAMIC FILLER AND APPLICATIONS AS RESONATOR AND LAMINATE THEREOF

TECHNICAL FIELD

The present disclosure is in the field of electrical and microwave devices and particularly relate to circuits characterized by plural conductive paths supported on a non-conductive substrate. The present disclosure relates to ceramic filler, dielectric resonator fluoropolymer-ceramic filler composite and the corresponding laminates possessing a low dielectric constant or low relative permittivity, very low loss tangent with little change in capacitance with respect to temperature and high quality factor. Further, the disclosure relates to processes for arriving at said fillers and methods of preparing dielectric resonator and fluoropolymer-ceramic filler compositions having desired properties.

BACKGROUND AND PRIOR ART OF THE DISCLOSURE

Dielectric resonators (DRs) are frequency-determining components in microwave devices which confine electromagnetic energy through total internal reflection by virtue of its high dielectric constant. In order to use a ceramic material for DR application, the material should have high dielectric constant ($\in_r$>10), Qu>2000 and near zero temperature coefficient of resonant frequency ($\tau_f$). Since the lower end of the microwave frequency spectrum are overcrowded, it is essential to use Ku and millimeter wave frequencies for wireless communications wherein low dielectric frequency determining components are a must.

It is known in the art that low dielectric ceramic materials can be gainfully exploited as particulate fillers for the development of filled fluoropolymer laminates such as PTFE (polytetrafluoroethylene) laminates. Such filled PTFE laminates with relative permitivities/dielectric constant of 2.94±0.04, 6.15±1.5 and 10.2±25 are available commercially with trade name RT/Duroid@ 6002, 6006 and 6010. Most of the low end microwave devices use glass fibre reinforced epoxy (FR-4) based circuit boards. However, these microwave circuit boards suffer from high loss tangent and low dielectric breakdown voltage. Many of the high power microwave devices demand circuit boards with low loss tangent (≤0.002), superior break down voltage threshold together with relative permittivity at par with FR-4 laminates. One of the reasons for the non-availability of equivalent filled PTFE laminates is attributed to the lack of high quality factor and low dielectric (13-15) microwave ceramic as particulate fillers.

Another important problem is the variation of dielectric constant of filled PTFE substrates with respect to temperature. This problem has so far been addressed by making compositions of polymer filled with more than one particulate ceramic material to control the temperature coefficient of dielectric constant. This approach is described in U.S. Pat. No. 5,358,775 where in a high dielectric constant (K≥4), low coefficient of dielectric constant (TCK≤150 ppm/° C.) electrical substrate material comprises a fluoropolymer (preferably PTFE) filled with Class 1 capacitor material such as barium neodymium titanate together with secondary fillers such as silica and alumina. Another important aspect of the aforementioned investigation is that the coefficient of thermal expansion of the composite must also be sufficiently low (CTE≤35 ppm/° C.) to result in composites which consistently maintains a low TCK. The same approach is extended in U.S. Pat. No. 5,552,210, wherein a high dielectric (K≥5) and comparatively low thermal coefficient (TCK<200 ppm/° C.) polymeric composite matrix is disclosed using particulate fillers such as titania, magnesia, alumina etc. incorporated in the fluoropolymeric matrix to tune the dielectric properties. Temperature stable substrate materials have also been realized in the ceramic filled non-fluoropolymeric based systems which is disclosed in U.S. Pat. No. 5,223,568 where in a ceramic filler blend comprising of barium nanotitanate_and silica is incorporated in the poly(1,2-butadiene) liquid resin. High capacitance laminates made of thin films of polytetrafluoroethylene filled with large amounts (25 to 85 vol %) of dielectric filler, in which the films are plated or clad with conductive material are disclosed in U.S. Pat. No. 4,996,097. The high dielectric fillers includes $TiO_2$, $BaTiO_3$ or a Ferro-electric complex.

A polymer composition having high dielectric constant, which varies little with temperature, has been disclosed in U.S. Pat. No. 5,739,193 which is made from poly(phenylene sulfide) (PPS), a thermoplastic polymer, filled with strontium titanate, barium neodymium titanate, barium strontium titanate/magnesium zirconate etc. as primary fillers and mica as the secondary filler material. A polymeric composition which has a dielectric constant K>4 at 20° C. which varies little with temperature is disclosed in U.S. Pat. No. 5,965,273 wherein a composite is made from a polymer or mixture of polymers and a ceramic or a mixture of ceramics where the polymer or mixture of polymer has a dielectric constant K in the range of about 1.5 to about 3.5 and a temperature coefficient of dielectric constant TCK that is negative and is between 0 and about −300 ppm/° C. The polymer is selected from a group consisting of poly(phenylene sulfide), cycloolefinic copolymer and mixtures thereof filled with a first ceramic filler material consisting of calcium zirconate, strontium zirconate, $CaTiSiO_5$, $PbZrO_3$, zirconia and mixtures thereof, each having dielectric constant in the range of about 15 to about 200 and TCK>0 up to about 300 ppm/° C. and an optional second ceramic comprising of one or more ceramic selected from the group consisting of aluminum oxide, magnesium titanate, mica, silicon dioxide, beryllia, spinel and thoria each having a dielectric constant in the range of about 15 and a TCK>0 up to about 300 ppm/° C. However, the use of secondary fillers which is used to control the TCK of the composite system often adversely affect fine control over relative permittivity, homogeneity, rheology etc. of the composite systems. This could be the reason why such temperature stable high dielectric PTFE based thermoplastic composite systems are not available in the open market for commercial use.

In order to overcome the difficulties of the prior art and to provide for superior components such as filled fluoropolymer laminates having enhanced properties, the Applicants herein describe the best possible mode of arriving at such laminates having all the desired properties best suited for microwave devices which will help them perform in a better way. Thus, the present disclosure is able to overcome all the associated drawbacks in this field of microwave technology.

STATEMENT OF THE DISCLOSURE

Accordingly, the present disclosure relates to a ceramic filler of formula I: $M'_{1-x}M''_xTaO_4$, wherein, M' and M" is individually a metal selected from a group comprising aluminum (Al), yttrium (Y), lanthanum (La), praseodymium (Pr), neodymium (Nd), europium (Eu), gadolinium (Gd), terbium (Tb), dysprosium (Dy), samarium (Sm) and ytterbium (Yb) or any combination thereof, TaO$_4$ is an oxide of tantalum metal, and x is an integer ranging from about 0 to about 1; a method of preparing ceramic filler of formula I: M'$_{1-x}$M''$_x$TaO$_4$, wherein, M' and M'' is a metal selected from a group comprising aluminum (Al), yttrium (Y), lanthanum (La), praseodymium (Pr), neodymium (Nd), europium (Eu), gadolinium (Gd), terbium (Tb), dysprosium (Dy), samarium (Sm) and ytterbium (Yb) or any combination thereof, TaO$_4$ is an oxide of tantalum metal, and x is an integer ranging from about 0 to about 1, said method comprising acts of: a) mixing an oxide of metal M' or M'' or a combination thereof and an oxide of tantalum to obtain a mixture; and b) subjecting the mixture to calcination to obtain the ceramic filler, wherein, the metal M' or M'' is individually a metal selected from a group comprising aluminum (Al), yttrium (Y), lanthanum (La), praseodymium (Pr), neodymium (Nd), europium (Eu), gadolinium (Gd), terbium (Tb), dysprosium (Dy), samarium (Sm) and ytterbium (Yb) or any combination thereof; a composition comprising fluoropolymer and ceramic filler, optionally along with glass fibre or industrially acceptable additive, wherein the ceramic filler is represented by formula M'$_{1-x}$M''$_x$TaO$_4$, and wherein, M' and M'' is individually a metal selected from a group comprising aluminum (Al), yttrium (Y), lanthanum (La), praseodymium (Pr), neodymium (Nd), europium (Eu), gadolinium (Gd), terbium (Tb), dysprosium (Dy), samarium (Sm) and ytterbium (Yb) or any combination thereof, TaO$_4$ is an oxide of tantalum metal, and x is an integer ranging from about 0 to about 1; a method of preparing a composition comprising fluoropolymer and ceramic filler, optionally along with glass fibre, wherein the ceramic filler is represented by formula M'$_{1-x}$M''TaO$_4$, wherein, M' and M'' is individually a metal selected from a group comprising aluminum (Al), yttrium (Y), lanthanum (La), praseodymium (Pr), neodymium (Nd), europium (Eu), gadolinium (Gd), terbium (Tb), dysprosium (Dy), samarium (Sm) and ytterbium (Yb) or any combination thereof, TaO$_4$ is an oxide of tantalum metal, and x is an integer ranging from about 0 to about 1, said method comprising act of mixing the fluoropolymer and the ceramic filler, optionally along with the glass fibre to obtain the composition.

BRIEF DESCRIPTION OF ACCOMPANYING DRAWINGS

In order that the disclosure may be readily understood and put into practical effect, reference will now be made to exemplary embodiments as illustrated with reference to the accompanying figures. The figures together with a detailed description below, are incorporated in and form part of the specification, and serve to further illustrate the embodiments and explain various principles and advantages, in accordance with the present disclosure where.

DETAILED DESCRIPTION OF DISCLOSURE

The present disclosure relates to a ceramic filler of formula I wherein, M' and M'' is individually a metal selected from a group comprising aluminum (Al), yttrium (Y), lanthanum (La), praseodymium (Pr), neodymium (Nd), europium (Eu), gadolinium (Gd), terbium (Tb), dysprosium (Dy), samarium (Sm) and ytterbium (Yb) or any combination thereof;

TaO$_4$ is an oxide of tantalum metal; and x is an integer ranging from about 0 to about 1.

In an embodiment of the present disclosure, the filler is AlTaO$_4$, LaTaO$_4$, SmTaO$_4$, YTaO$_4$, YbTaO$_4$, PrTaO$_4$, NdTaO$_4$, EuTaO$_4$, GdTaO$_4$, TbTaO$_4$, DyTaO$_4$ or Y$_{0.4}$Al$_{0.6}$TaO$_4$.

In another embodiment of the present disclosure, the filler has a mean particle size ranging from about 0.8 µm to about 10 µm.

In yet another embodiment of the present disclosure, the filler has a dielectric constant ranging from about 12 to about 15, quality factor ranging from about 120000 to about 200000 and thermal co-efficient of dielectric constant ranging from about 0 ppm/° C. to about −100 ppm/° C.

The present disclosure further relates to a method of preparing ceramic filler of formula I wherein, M' and M'' is a metal selected from a group comprising aluminum (Al), yttrium (Y), lanthanum (La), praseodymium (Pr), neodymium (Nd), europium (Eu), gadolinium (Gd), terbium (Tb), dysprosium (Dy), samarium (Sm) and ytterbium (Yb) or any combination thereof;

TaO$_4$ is an oxide of tantalum metal; and x is an integer ranging from about 0 to about 1, said method comprising acts of:
a. mixing an oxide of metal M' or M'' or a combination thereof and an oxide of tantalum to obtain a mixture; and
b. subjecting the mixture to calcination to obtain the ceramic filler;

wherein, the metal M' or M'' is individually a metal selected from a group comprising aluminum (Al), yttrium (Y), lanthanum (La), praseodymium (Pr), neodymium (Nd), europium (Eu), gadolinium (Gd), terbium (Tb), dysprosium (Dy), samarium (Sm) and ytterbium (Yb) or any combination thereof.

In an embodiment of the present disclosure, the metal oxide is in an amount ranging from about 15 wt % to about 40 wt % and the oxide of tantalum is in an amount ranging from about 65 wt % to about 85 wt %.

In another embodiment of the present disclosure, the oxide of metal M' or M'' is selected from a group comprising aluminum oxide, yttrium oxide, lanthanum oxide, praseodymium oxide, neodymium oxide, europium oxide, gadolinium oxide, terbium oxide, dysprosium oxide, samarium oxide and ytterbium oxide or any combination thereof, and wherein the oxide of tantalum is tantalum pentoxide.

In yet another embodiment of the present disclosure, the mixing is carried out by a method selected from a group comprising ball milling, attrition milling, hand mixing or any combination thereof, for time period ranging from about 20 hours to about 25 hours.

In still another embodiment of the present disclosure, a method of preparing ceramic filler of formula I further comprises drying the mixture.

In still another embodiment of the present disclosure, the calcination is carried out for cycles ranging from about one to about seven, at a temperature ranging from about 1250° C. to about 1380° C. and wherein the heating rate ranges from about 8° C./min to about 15° C./min.

In still another embodiment of the present disclosure, the ceramic filler along with an industrially acceptable additive, is subjected to the process of pressing and sintering to obtain a dielectric resonator.

In still another embodiment of the present disclosure, the sintering is carried out at a temperature ranging from about 1500° C. to about 1700° C. and wherein the heating rate ranges from about 10° C./min to about 18° C./min.

In still another embodiment of the present disclosure, the industrially acceptable additive is a binder; and wherein the binder is selected from a group comprising of polyvinyl alcohol, poly vinyl butyral (PVB), Methyl cellulose, poly vinyl pyrrolidone and polyethylene glycol, or any combination thereof.

In still another embodiment of the present disclosure, the filler is subjected to a process of sintering optionally along with an industrially acceptable additive to obtain a dielectric resonator.

In still another embodiment of the present disclosure, the industrially acceptable additive is a binder; and wherein the binder is selected from a group comprising of polyvinyl alcohol, poly vinyl butyral (PVB), Methyl cellulose, poly vinyl pyrrolidone and polyethylene glycol, or any combination thereof.

In still another embodiment of the present disclosure, the dielectric resonator has a dielectric constant in the range of about 12 to about 15 and quality factor in the range of about 92,000 to about 189000.

In still another embodiment of the present disclosure, the filler is further constituted to a composition along with fluoropolymer, optionally along with glass fibre or industrially acceptable additive.

In still another embodiment of the present disclosure, the fluoropolymer is selected from a group comprising polytetrafluoroethylene (PTFE), hexafluoropropene (HFP), tetrafluoroethylene (TFE), and perfluoroalkylvinyl ether (PAVE) or any combination thereof, preferably polytetrafluoroethylene (PTFE); and wherein the glass fibre is selected from a group comprising microglass fibre, alkali free E-glass fibre and alkali free S-glass fibre or any combination thereof, preferably alkali free E-glass fibre.

In still another embodiment of the present disclosure, wherein the ceramic filler is at a concentration ranging from about 30 volume % to about 60 volume %; the fluoropolymer is at a concentration ranging from about 30 volume % to about 50 volume %; and the glass fibre is at a concentration ranging from about 2 volume % to about 6 volume %.

In still another embodiment of the present disclosure, the ceramic filler and the composition has a dielectric constant of about 4 to about 4.5, dielectric loss of about 0.0016 to about 0.002 with a temperature coefficient of dielectric constant of about −30 ppm/° C. to about −100 ppm/° C.

In still another embodiment of the present disclosure, the ceramic filler and the method of constituting the filler in to a composition is carried out by mixing the fluoropolymer and the ceramic filler, optionally along with the glass fibre or the industrially acceptable additive.

In still another embodiment of the present disclosure, the mixing is sigma mixing; and wherein the mixing is carried out in a sigma mixer having a counter rotating blade rotating at speed ranging from about 80 rpm to about 120 rpm and for time-period ranging from about 1 hour to about 2 hours.

In still another embodiment of the present disclosure, the mixing optionally comprises adding a lubricant; and wherein the lubricant is selected from a group comprising dipropylene glycol, diethylene glycol, poly propylene glycol and paraffin oil, or any combination thereof.

In still another embodiment of the present disclosure, the composition obtained is further subjected to acts of extruding, calendering and hot pressing to obtain a laminate.

In still another embodiment of the present disclosure, the extrusion is carried out with a ram extruder at pressure ranging from about 110 kg/cm$^2$ to about 170 kg/cm$^2$, the calendering is carried out by passing the composition between rollers at speed ranging from about 20 rpm to about 60 rpm, and the hot pressing is carried out in a die at temperature ranging from about 330° C. to about 380° C., pressure ranging from about 110 kg/cm$^2$ to about 180 kg/cm$^2$ and for time period ranging from about 8 hours to about 20 hours.

The present disclosure furthermore relates to a composition comprising fluoropolymer and ceramic filler, optionally along with glass fibre or industrially acceptable additive, wherein the ceramic filler is represented by formula M'$_{1-x}$M''$_x$TaO$_4$;

and wherein, M' and M'' is individually a metal selected from a group comprising aluminum (Al), yttrium (Y), lanthanum (La), praseodymium (Pr), neodymium (Nd), europium (Eu), gadolinium (Gd), terbium (Tb), dysprosium (Dy), samarium (Sm) and ytterbium (Yb) or any combination thereof;

TaO$_4$ is an oxide of tantalum metal; and x is an integer ranging from about 0 to about 1.

The present disclosure furthermore relates to a method of preparing a composition comprising fluoropolymer and ceramic filler, optionally along with glass fibre, wherein the ceramic filler is represented by formula M'$_{1-x}$M''$_x$TaO$_4$;

wherein, M' and M'' is individually a metal selected from a group comprising aluminum (Al), yttrium (Y), lanthanum (La), praseodymium (Pr), neodymium (Nd), europium (Eu), gadolinium (Gd), terbium (Tb), dysprosium (Dy), samarium (Sm) and ytterbium (Yb) or any combination thereof;

TaO$_4$ is an oxide of tantalum metal; and x is an integer ranging from about 0 to about 1, said method comprising act of mixing the fluoropolymer and the ceramic filler, optionally along with the glass fibre to obtain the composition.

The present disclosure relates to ceramic filler, the process of preparing said filler and application of same as ceramic dielectric resonator. The disclosure further relates to a ceramic filled fluoropolymeric dielectric laminate, process of preparing said laminate and their use in microwave circuit applications.

In an embodiment, the ceramic filler of the instant disclosure comprises rare earth metal or aluminium (Al) or yttrium (Y) and metal oxide, wherein the rare earth metal is selected from a group comprising lanthanum (La), samarium (Sa), yttribium (Yb), praseodymium (Pr), neodymium (Nd), europium (Eu), gadolinium (Gd), terbium (Tb) and dysprosium (Dy), or any combination thereof; and wherein the metal oxide is tantalum pentoxide.

In another embodiment, the ceramic filler of the present disclosure is represented by the formula $M'_{1-x}M''_xTaO_4$, wherein M' and M" are individually aluminium (Al) or Yttrium (Y) or rare earth metals, wherein rare earth metals are selected from a group comprising lanthanum (La), samarium (Sa), yttribium (Yb), praseodymium (Pr), neodymium (Nd), europium (Eu), gadolinium (Gd), terbium (Tb) and dysprosium (Dy), or any combination thereof; x is an integer ranging from about 0 to 1; and $TaO_4$ is oxide of tantalum.

In another embodiment, the ceramic filler M'1-xM"xTaO4 is a hydrophobic phase pure material with a dielectric constant in the range of about 12 to about 15. The measured quality factor of the filler using a dielectric resonator prepared from the said ceramic filler is in the range of about 1,80000 to about 2,20000 and with a temperature coefficient of dielectric constant of less than 0 ppm/° C. and greater than −100 ppm/° C.

In another embodiment, particle size of said ceramic filler ranges from about 0.8 μm to about 10 μm, preferably ranging from about 2 μm to about 5 μm, wherein particle size influences the elasticity of the said composition.

In an embodiment, the ceramic filler of the present disclosure is individually aluminium tantalate ($AlTaO_4$), lanthanum tantalate ($LaTaO_4$), samarium tantalate ($SmTaO_4$), yttrium tantalate ($YTaO_4$), yttribium tantalate ($YbTaO_4$), praseodymium tantalate ($PrTaO_4$), europium tantalate ($EuTaO_4$), gadolinium tantalate ($GdTaO_4$), terbium tantalate ($TbTaO_4$), dysprosium tantalate ($DyTaO_4$) or $Y_{0.4}Al_{0.6}TaO_4$, or any combination thereof.

In another embodiment of the present disclosure, the ceramic filler is provided optionally with a silane coupling agent in an amount ranging from about 0.2 volume % to about 2 volume %, wherein the silane coupling agent is selected from a group comprising phenyl trimethoxy silane, vinyl trimethoxy silane, amino ethyl amino trimethoxy silane and a mixture of phenyl trimethoxy silane and amino ethyl amino propyl trimethoxy silane, or any combination thereof. The silane coupling agent renders the surface of the filler hydrophobic.

In another embodiment, the preferred silane coupling agents are vinyl trimethoxy silane and phenyl trimethoxy silane and are present in an amount ranging from about 0.5 volume % to about 2.5 volume %, preferably 2 volume %.

The disclosure further relates to a process of preparing the ceramic filler, wherein high purity rare earth metal oxide or aluminium oxide or yttrium oxide and tantalum pentoxide are made to react, and said process comprises the following steps:
a. oxide of rare earth metal, or aluminium or yttrium and tatalum pentoxide are weighed stoichiometrically and mixed to obtain a mixture; and
b. the mixture is dried and calcined by single or repeated calcination for varied duration, followed by cooling.

In an embodiment, mixing is carried out by a method selected from a group comprising of ball milling, attrition milling and hand mixing, or any combination thereof, wherein the mixing is carried out for a time period of 20 hrs to about 24 hrs.

In an embodiment, calcination is carried out at a temperature ranging from about 1250° C. to about 1300° C. for about one to seven cycles and is followed by cooling carried out at a temperature ranging from about 20° C. to about 30° C.

The disclosure further relates to a process of preparing a dielectric resonator, wherein the calcined ceramic filler is subjected to the following acts:
a. the cooled calcined mixture is ground optionally with industrially acceptable additive, followed by drying and grinding again to obtain a powder;
b. the resultant powder is uniaxially pressed to a compact shape with preferred dimensions, preferably to a cylindrical compact; and
c. the cylindrical compact is sintered followed by polishing to obtain; a ceramic compact which is a dielectric resonator; whose dielectric properties are measured.

In an embodiment, the industrially acceptable additive is a binder, wherein the binder is selected from a group comprising polyvinyl alcohol, poly vinyl butyral (PVB), Methyl cellulose, poly vinyl pyrrolidone and polyethylene glycol, or any combination thereof In another embodiment, polyvinyl alcohol (PVA) is employed during calcination in the range of about 2 wt % to about 7 wt %, preferably 5 wt %.

In another embodiment, the dimensions of the cylindrical compact are in the range of about 11 mm in diameter and about 6-7 mm in height.

In another embodiment, sintering is carried out a temperature ranging from about 1500° C. to about 1700° C. at a rate ranging from about 10° C./min to about 18° C./min.

In another embodiment, the sintered cylindrical compact is polished using fine grade (2000) emery paper to avoid any surface irregularities In an embodiment, the dielectric resonator prepared from the ceramic filler of the present disclosure has a dielectric constant of about 12 to about 15 and a quality factor in the range of about 1,80000 to about 2,20000. The said dielectric resonator is used in microwave and millimeter wave applications.

The disclosure further relates to a composition comprising ceramic filler of the instant disclosure and fluoropolymer matrix, optionally along with glass fibre or additives or a combination thereof, wherein the composition is a laminate for microwave substrate application.

In an embodiment, fluoropolymer matrix is selected from a group comprising polytetrafluoroethylene (PTFE), hexafluoropropene (HEP), tetrafluoropolyethylene (TFE), and perfluoroalkylvinyl ether (PAVE) or any combination thereof, preferably polytetrafluoroethylene.

In another embodiment, the composition comprises about 30 to 60 volume % of ceramic filler and about 2 to about 6 volume % of micro fibre glass.

In another embodiment, the filler particles form about 30 volume % to 70 volume % of the laminate of the present invention. In a preferred embodiment, weight of the inorganic filler particles ranges from about 35 volume % to about 65 volume % of the laminate of the present invention. In applications where medium dielectric constant (K) is of primary importance, it is preferred that the laminates of the present invention comprises from about 40 volume % to about 65 volume % of the filler materials.

In an embodiment, the disclosure further relates to a method of preparing the composition, said method comprising acts of:
a. ceramic filler, fluoropolymer matrix and glass fibre and mixed optionally along with lubricant to obtain a dough;
b. the mixed dough is subjected to extrusion using a ram extruder to obtain preforms;
c. the preforms are subjected to calendaring with a gear ratio of 1:1.2; and d. the calendered preforms are subjected to hot pressing to obtain a composition as a laminate.

In another embodiment, the lubricant is selected from a group comprising di propylene glycol, diethylene glycol, poly propylene glycol and paraffin oil, or any combination thereof, preferably di propylene glycol in the range of about 124 ml to about 160 ml In another embodiment, extrusion is carried out with a ram extruder at pressure ranging from about 100 kg/cm$^2$ to about 170 kg/cm$^2$.

In another embodiment, calendaring is carried out by passing the composition between rollers at a speed ranging from about 20 rpm to about 60 rpm.

In another embodiment, hot pressing is carried out at a temperature ranging from about 330° C. to about 380° C. under pressure ranging from about 110 kg/cm$^2$ to about 180 kg/cm$^2$ for a time period of about 8 hrs to about 20 hrs.

In an embodiment, the laminates post hot pressing are chemically etched and subsequently cladded with a metal selected from a group comprising copper, gold and silver, or any combination thereof. Preferably copper is cladded to the laminate through vacuum lamination and/or electroless plating followed by electroplating, wherein the metallic layer is cladded to at least one portion of a surface of the laminate.

In an embodiment, the micro glass fibre/E-glass fibre present in the laminates of the instant disclosure reinforces the structure of the laminate by providing adequate mechanical strength to the laminate.

In an embodiment, the laminate has a dielectric constant of about 4 to 5 and loss tangent less than 0.0018 up to 20 GHz, preferably in the range of about 0.0016 to about 0.0022 with a temperature coefficient of dielectric constant ranging from about −18 to about −71 ppm/° C.

In an embodiment, the laminates exhibit a low thermal coefficient of dielectric constant together with medium dielectric constant/relative permittivity (k).

The invention is further illustrated by the following examples. The following examples are provided for illustrative purposes only and are not intended to limit the scope of the invention.

Materials Used for Arriving at the Examples of the Instant Disclosure:

PTFE powder sold by M/s. Hindustan Fluorocarbon Limited, Hyderabad, India under the trade name H71 A is used. Microfiber glass is obtained from M/s Binani glass, Goa, India. JD1 grade copper foils are obtained from M/s Gould Electronics, Germany. M/s. Shipley, Germany make chemical solutions are used for the electroless and electroplating processes.

EXAMPLES

Example 1

Preparation of Ceramic Fillers and Dielectric Resonators Thereof a) General Process for Preparation of Ceramic Filler and Dielectric Resonator Thereof:
Ceramic Filler The filler with a general formula $M'_{1-x}M''_xTaO_4$, is prepared by allowing high purity rare earth metal oxide(s) or aluminium oxide or yttrium oxide to react with and tantalum pentoxide powders through the solid state ceramic route. The powders are weighed stoichiometrically and ball milled along with double distilled water for about 20 hrs to about 30 hrs in polypropylene bottle using zirconia balls with distilled water as a medium, to obtain a mixture. The mixture obtained is dried and calcined at temperature for about 1250° C. to about 1300° C. by single or repeated calcination steps for about 4 hrs to about 10 hrs and cooled to a temperature of about 20° C. to 30° C. to obtain ceramic filler of particle size in the range of about 0.8 µm to about 10 µm.

The ceramic filler is thereafter sintered at specific temperatures to obtain a dielectric resonator. The process followed is provided in the section below.
Dielectric Resonator The calcined powder of the ceramic filler is ground well by adding about 2 wt % to about 7 wt % polyvinyl alcohol (PVA), wherein PVA is a binder. The obtained mixture is dried and ground again. The resultant powder is uniaxially pressed into a cylindrical shape to have a diameter of about 11 mm and height of about 6 mm to about 7 mm, which is suitable for microwave measurement. The obtained cylindrical compact is sintered at variable temperatures in the range of about 1500° C. to about 1680° C. The sintered samples are polished using fine grade (2000) emery paper to avoid any surface irregularities and bulk density is determined using Archimedes principle.

b) Preparation of Yttrium Tantalate (YTaO$_4$) Filler and Dielectric Resonator Thereof:
Ceramic Filler About 40 g of ceramic filler, YTaO$_4$, is prepared by mixing about 13.5272 g of Y$_2$O$_3$ (99.99% pure) and about 26.4998 g of Ta$_2$O$_5$ (>99.9% pure) in an agate mortar using double distilled water. The mixture obtained is dried at a temperature of about 80° C. in a hot air oven and calcined in a temperature programmable silicon carbide (SiC) furnace at a temperature ranging from about 1250° C. to about 1300° C. for about 4 hrs to about 10 hrs at a heating rate of about 10° C./min to about 15° C./min. The phase purity of the calcined powder is determined using Bruker 5005 model powder X-ray diffractometer having CuK$_\alpha$ as source.

The ceramic filler is thereafter sintered at specific temperatures to obtain a dielectric resonator. The process followed is provided in the section below.
Dielectric Resonator To the calcined powder of yttrium tantalate filler, about 5% to about 7% weight of polyvinyl alcohol as binder is added and a fine powder of YTaO$_4$ is obtained by grinding the calcined powder in an agate mortar. The green disc shaped compacts of YTaO$_4$ are made using tungsten carbide die under a pressure of 250 MPa, by uniaxially pressing the ground powder. The disc shaped pellets are sintered with a heating rate of about 10° C./min to about 15° C./min in atmospheric air inside a SiC furnace at variable sintering temperatures ranging from about 1550° C. to about 1670° C. During the sintering process, binder removal is ensured by dwelling the sample at a temperature of about 600° C. for about 30 minute duration. The sintered samples are polished using fine grade (2000) emery paper and bulk density is determined using Archimedes principle.

c) Preparation of Aluminium Tantalate (AlTaO) Filler and Dielectric Resonator Thereof:
Ceramic Filler About 40 g of ceramic filler, AlTaO$_4$, is prepared by mixing about 61.1766 g of Al$_2$O$_3$ (99.99% pure) and about 265.14 g of Ta$_2$O$_5$ (>99.9% pure) in an agate mortar using double distilled water. The mixture obtained is dried at a temperature of about 80° C. in a hot air oven and calcined in a temperature programmable silicon carbide (SiC) furnace at a temperature ranging from about 1250° C. to about 1300° C. for about 4 hrs to about 10 hrs at a heating rate of about 10° C./min to about 15° C./min. The phase purity of the calcined powder is determined using Bruker 5005 model powder X-ray diffractometer having $CuK_\alpha$ as source.

The ceramic filler is thereafter sintered at specific temperatures to obtain a dielectric resonator. The process followed is provided in the section below.

Dielectric Resonator

To the calcined powder of aluminum tantalate filler, about 5% to about 7% weight of polyvinyl alcohol as binder is added and a fine powder of $AlTaO_4$ is obtained by grinding the calcined powder in an agate mortar. The green disc shaped compacts of $AlTaO_4$ are made using tungsten carbide die under a pressure of about 250 MPa, by uniaxially pressing the ground powder. The disc shaped pellets are sintered with a heating rate of about 10° C./min to about 15° C./min in atmospheric air inside a SiC furnace at different sintering temperatures ranging from about 1550° C. to about 1670° C. During the sintering process, binder removal is ensured by dwelling the sample at a temperature of about 600° C. for about 30 minute duration. The sintered samples are polished using fine grade (2000) emery paper and bulk density is determined using Archimedes principle d) Preparation of $Y_{0.4}Al_{0.6}TaO_4$ Ceramic Filler and Dielectric Resonator Thereof:

Ceramic Filler

About 54.19 g of $Y_2O_3$, about 36.705 g of $Al_2O_3$ and about 265.14 g of tantalum pentoxide powders are weighed stoichiometrically and ball milled for about 24 hours in polypropylene bottle using zirconia balls with distilled water as a medium. The mixture obtained is dried and calcined at temperature of about 1300° C. by single or repeated calcination steps for different duration and cooled to a temperature of about 20° C. to about 30° C.

The ceramic filler is thereafter sintered at specific temperatures to obtain a dielectric resonator. The process followed is provided in the section below.

Dielectric Resonator

The calcined powder is ground well by adding about 5 wt % polyvinyl alcohol (PVA), wherein PVA is a binder. The obtained mixture is dried and ground again. The resultant powder is uniaxially pressed into a cylindrical shape to have a diameter of about 11 mm and height of about 6-7 mm, which is suitable for microwave measurement. Later, the obtained cylindrical compact is sintered at different temperatures in the range of about 1600° C. to about 1720° C. The sintered samples are polished to avoid any surface irregularities and are subjected to microwave measurements.

While preferred embodiments have been shown and described above, various modifications and substitutions may be made thereto without departing from the spirit and scope of the present disclosure. Accordingly, it is to be understood that apart from $YTaO_4$, $AlTaO_4$ and $Y_{0.4}Al_{0.6}TaO_4$ other filler compositions including but not limiting to the general formula $(M'_{1-x}M''_xTaO_4)$ can be prepared by a person of average skill in the art by following the processes described above. Such replacement of one known metal (M) with another metal is within the scope of the present disclosure and does not require any extraordinary technical effort.

In an embodiment, the low frequency (<13 MHz) dielectric properties of the resonator of the instant disclosure are measured using an impedance analyzer. Highly conducting silver paste is applied on both surfaces of the sintered ceramic compacts and copper leads are fixed on both sides for the capacitance measurement. The microwave dielectric constant is measured using Hakki & Coleman dielectric post resonator method (B. W. Hakki and P. D. Coleman, "A dielectric resonator method of measuring inductive capacities in millimeter range", IEE Trans. Micro. Theory and Technique, Vol. 8, pp 402-410, 1960). The resonator is placed between two gold coated copper plates and microwave energy is coupled through E field probes to excite various resonant modes. $TE_{011}$ mode is selected carefully from the resonant spectrum for the dielectric constant measurements. The dielectric resonator derived from yttrium and aluminum ceramic fillers have a relative permittivity of about 12 to about 15 together with a quality factor of about 134000 and about 58200, respectively.

Comparative Study of Dielectric Resonator of the Present Disclosure with Fillers and the Resonator Available in the Art

TABLE 1

Comparative study of various composite materials-

| Name of the Composition | Sintering Temperature (° C.) | $\epsilon_r$ | Quality factor | $\tau_f$ | Reference |
|---|---|---|---|---|---|
| $AlNbO_4$ | 1250 | 12 | 34000 | −56 | Prior art |
| $YTaO_4$ | 1690 | 14 | 189000 | −71 | Filler of instant disclosure |
| $AlTaO_4$ | 1640 | 12.8 | 92,000 | −44 | Filler of instant disclosure |
| $Y_{0.4}Al_{0.6}TaO_4$ | 1665 | 13.1 | 1,18,200 | −51 | Filler of instant disclosure |

As observed from the table, the dielectric resonator derived from the filler of the present disclosure is superior in all the properties such as dielectric constant, quality factor and temperature coefficient of dielectric constant and is able to successfully overcome the various drawbacks to provide for improved products when compared to the currently available materials for microwave applications. In other words, the major advantages showcased by the dielectric resonator derived from the filler of the present disclosure is the high quality factor in the range of about 92,000 to about 189000, wherein higher quality factor indicates a lower rate of energy loss relative to the stored energy inside the ceramic. Further, the ceramic filler of the instant disclosure is a dielectric resonator for microwave and millimeter wave application.

Example 2

Preparation of Fluoropolymer-Ceramic Filler Composite Substrates/Laminates

Different laminates comprising of fluoropolymer (example, polytetrafluoroethylene), ceramic filler of the instant disclosure- and alkali free E-glass fibre are made by the general process described below.

Theoretical modeling (based on modified Lichtenecker-Rother approach) is employed to arrive at the specific composite ratio of PTFE, ceramic filler of the instant invention, micro fibre glass and lubricant, wherein PTFE is in the range of about 28 g to about 40 g, ceramic filler is in the range of about 58 g to about 70 g, micro fibre glass is in the range of about 1 g to about 7 g and lubricant is in the range of about 6 ml to about 20 ml. This specific composite ratio is required to obtain desired dielectric properties (as described in the instant disclosure) of the laminates.

Being a heterogeneous system, the effective dielectric constant of the ceramic filled PTFE laminate is predicted using modified Lichtenecker-Rother approach (Equation 1) by judiciously accounting the depolarization of the particulate filler, shape factor, the effect of interface region, ceramic-ceramic connectivity and other similar factors.

$$\log \varepsilon_c = v_f \log \varepsilon_f + v_m (1-k) \log\left(\frac{\varepsilon_m}{\varepsilon_f}\right)$$ [Equation 1]

where $v_f$, $v_m$ are the volume fractions and $\varepsilon_f$, $\varepsilon_m$ are the dielectric constant of the filler and matrix respectively, k is the fitting factor and $\varepsilon_c$ is the effective dielectric constant of the composite.

Dimensionally stable ceramic filled PTFE laminates are prepared through Sigma Mixing, Extrusion and Calendering followed by Hot pressing (SMECH) process. In the said process, PTFE of about 280 g to about 350 g, ceramic filler of the instant disclosure of about 580 g to about 700 g and micro fibre glass of about 9 g to about 63 g are initially mixed well through sigma mixing, optionally in the presence of a lubricant selected from a group comprising diethylene glycol, poly propylene glycol, paraffin oil preferably about 124 to about 160 ml Di propylene Glycol. Said mixing of the ingredients is performed in a Sigma Mixer having counter rotating blade rotating at about 80-120 rpm for about 1 to 2 hours. The finely mixed dough obtained from sigma mixer is subjected to paste extrusion at a pressure of about 110 kg/cm² to about 170 kg/cm² using a ram extruder to obtain preforms of size of about 8 cm (L)×2 cm (B)×1 mm (T). The preforms thus obtained are passed through the rollers of a calendering machine which has an rpm ratio of 1:1.2 (roller speed of about 20 to 60 rpm) for imparting better shear force. Green tapes of less than 100 µm having uniform filler distribution obtained without pinholes after calendering. The calendered tapes are stacked one over the other and placed inside the stainless steel die for hot pressing at temperature ranging from about 330° C. to about 380° C., pressure ranging from about 110 Kg/cm² to about 140 Kg/cm² and for a time period of about 8-20 hours to obtain pore free and dimensionally stable laminates having desired final thickness of about 0.03 mm to about 2.2 and width of about 200 mm to about 450 mm.

The above processes sigma mixing, extrusion and calendering ensure uniform distribution of the filler in the PTFE matrix, whereas, hot pressing of the stacked calendered tapes inside stainless steel die results in homogeneous and dimensionally stable PTFE laminates.

While preferred embodiments have been illustrated above and described in the examples, various modifications and substitutions may be made thereto without departing from the spirit and scope of the present disclosure. Accordingly, it is to be understood that apart from polytetrafluoroethylene (PTFE), other fluoropolymers including but not limiting to hexa fluoropropene (HFP), tetrafluoroethylene (TFE), and perfluoro alkyl vinyl ether (PAVE) can be made use by a person of average skill in the art to prepare electrical composite substrates/laminate having the ceramic fillers of the present disclosure. Such replacement of one known fluoropolymer with another fluoropolymer or replacement of one ceramic filler of the instant disclosure with another ceramic filler of the instant disclosure is within the scope of the present disclosure and does not require any extraordinary technical effort.

The bare hot pressed laminates obtained as above are chemically etched to obtain better adhesion to metal surfaces. The laminates are chemically etched using sodium naphthalate based etchant solution. The etchant solution is prepared by dissolving naphthalene (about 10-15 wt %) in moisture free tetra hydrofuran (about 80 to 90 wt %) and subsequently adding about 1-4 wt % of metallic sodium. Sodium takes about 3-4 hours to react completely, resulting in the formation of a black colored etchant solution. The laminates obtained after SMECH (Sigma mixing, Extrusion, Calendaring and Hot pressing) process are immersed in the above prepared sodium naphthalate based etchant solution for about 0.5 minutes to about 2 minutes and then washed thoroughly with acetone followed by drying for about 1 hour to about 2 hours. Post etching, copper foils are vacuum laminated to the surface of the flat laminate. Alternately, the metallic conductor layer is built over the laminates through electroless and electroplating processes.

The electroless plating followed by electroplating is done for the chemically etched laminates by the process as described below:

Chemically etched laminate is dipped in the Cleaner conditioner (about 95% DI water and about 5% Cleaner conditioner 3233) bath for about 10±1 minutes at about 43±3° C. followed by rinsing with water for about 20-40 seconds at room temperature (about 20° C.-30° C.). Then, the sample is pre-activated by immersing in a pre-activator bath [CATAPOSIT PRE-DIP 404] at room temperature of about 20° C.-30° C. for a time-period of about 2 to 3 hours followed by rinsing with water. The pre-activated sample is again immersed in an activator bath (CATAPOSIT PRE-DIP 404 and CATAPOSIT 44) for about 5 to 10 minutes at about 40 to 45° C. followed by thorough water rinse. The pre-activated sample is then subjected to electroless copper plating on activated substrate using CIRCUPOSIT EL COPPER 3350 M, CIRCUPOSIT EL 3350 A and CIRCUPOSIT EL COPPER 3350 B for about 20 to 30 minutes at temperature ranging from about 40 to about 45° C. The electroless plated substrate is then rinsed thoroughly with water for about 10 to 20 minutes. On the other hand, electroplating process is carried out in a standard electroplating bath at about 0.5 micrometer/minute.

Figure 1:
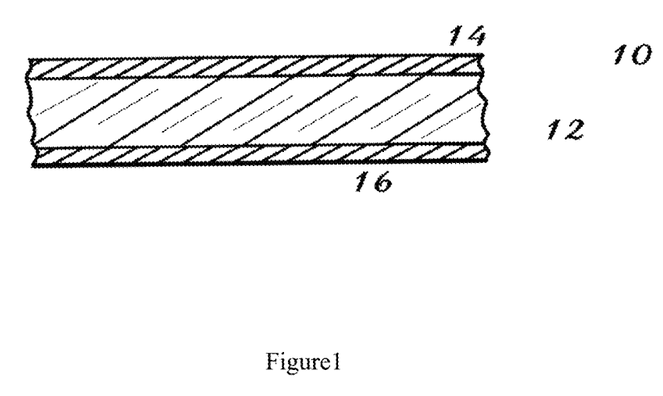
FIG. 1 illustrates the schematic diagram of dielectric laminate of the instant disclosure.
Figure 2:
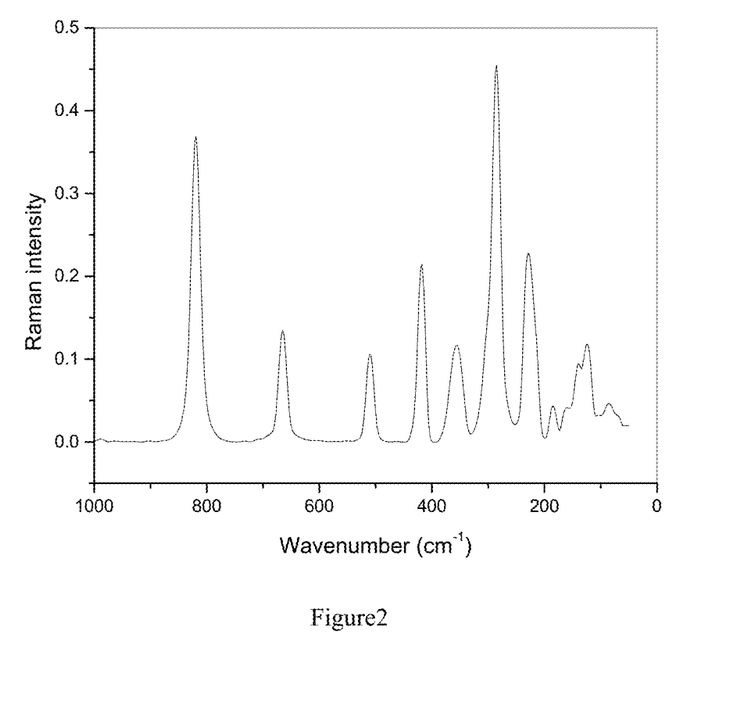
FIG. 2 illustrates the Laser Raman spectrum of the ceramic particulate filler of the instant disclosure.
Figure 3:
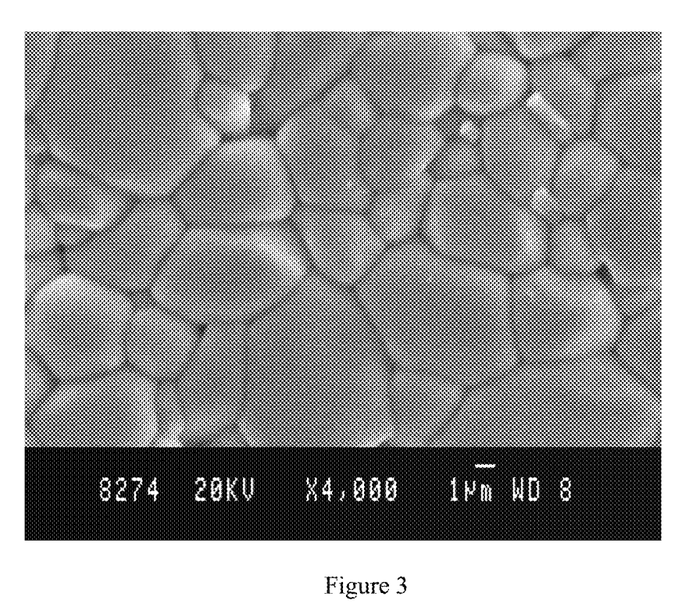
FIG. 3 illustrates the Scanning Electron Microscope (SEM) image of sintered ceramic filler, yttrium tantalate.
Figure 4:
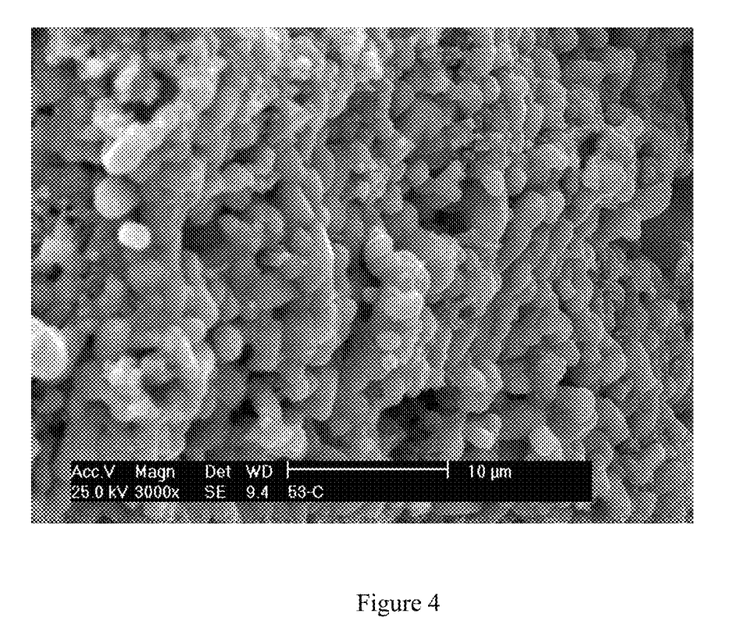
FIG. 4 illustrates the cross sectional SEM image of dielectric laminate comprising PTFE and yttrium tantalate of the instant disclosure.
Figure 5:
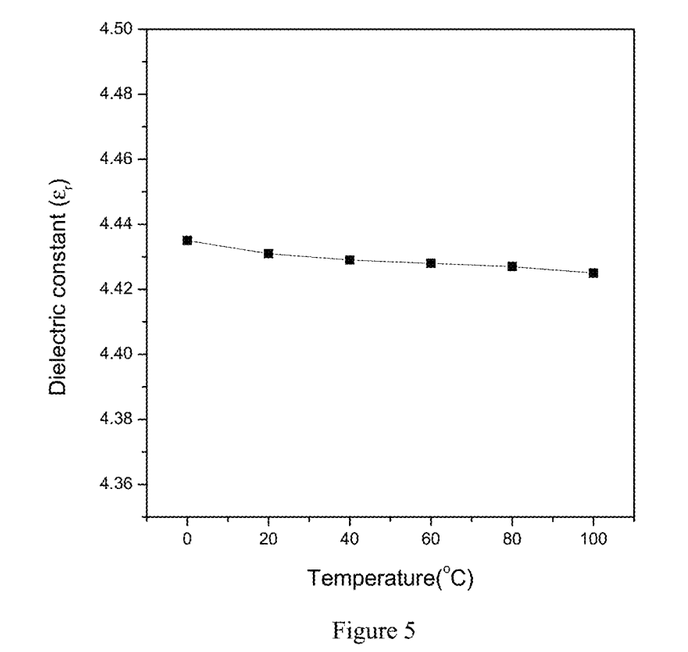
FIG. 5 illustrates the temperature dependent variation of dielectric constant of the dielectric laminate of the instant disclosure

FIG. 1 illustrates filled fluoropolymeric circuit laminate of the invention which is denoted by 10, and 12 is the dielectric laminate placed between the copper conducting layers represented by 14 and 16.

Example 3

Properties of Fluoropolymer-Ceramic Filler Laminates

Various fluoropolymer-ceramic filler laminates are prepared by the processes described above and are studied for their respective dielectric properties.

(a) Properties of PTFE-GdTaO$_4$ PTFE-AlTaO$_4$ and PTFE-SmTaO4 Laminates

PTFE-GdTaO$_4$ laminate (Sample A) is prepared by subjecting about 33.5 g of GdTaO$_4$ filler, about 15.5 g of HFC H71 grade PTFE, about 1 g of micro fiber glass, and about 15 ml of di propylene glycol to SMECH process as described in example 2.

PTFE-AlTaO$_4$ laminate (Sample B) is similarly prepared by subjecting about 33.5 g of AlTaO$_4$ filler, about 15.5 g of HFC H71 grade PTFE, about 1 g of micro fiber glass, and about 15 ml of lubricant (Di propylene Glycol) to SMECH process as described in example 2.

Further, PTFE-SmTaO$_4$ laminate (sample C) is prepared by subjecting about 33.5 g of AlTaO$_4$ filler, about 15.5 g of HFC H71 grade PTFE, about 1 g of micro fiber glass and 15 ml of di propylene glycol to SMECH process as described in example 2.

The microwave dielectric properties of the samples obtained above are measured in the X-band region using waveguide cavity perturbation technique and the results are given in table 1. In the X-band waveguide cavity perturbation technique, the frequency (fc) and quality factor (Qc) of each resonant modes of the empty cavity is measured first. Then the sample is introduced into the cavity and each resonant mode is perturbed. The sample inside the cavity is moved within the cavity to get maximum deflection of the resonant mode from the initial position. The resonant frequency (fs) and quality factor (Qs) at maximum perturbed position are noted. Using these values, the real and imaginary parts of dielectric constant is calculated using Equations 2 and 3.

$$\varepsilon'_r = 1 + \frac{f_c - f_s}{2f_s}\left(\frac{V_c}{V_s}\right) \quad \text{(Equation 2)}$$

$$\varepsilon'' = \frac{V_c}{4V_s}\left(\frac{Q_c - Q_s}{Q_c Q_s}\right) \quad \text{(Equation 3)}$$

TABLE 2

Microwave dielectric properties of PTFE/MTaO$_4$/E-glass composite system

| Sample | K | tanδ | TCK(ppm/° C.) |
|---|---|---|---|
| A | 4.8 | 0.0018 | −28 |
| B | 4.3 | 0.0016 | −21 |
| C | 4.9 | 0.002 | −33 |

The above table 2 illustrates that different samples of PTFE/MTaO$_4$ composites exhibit the desired parameters such as low dielectric constant ranging from about 4 to about 5, low loss tangent ranging from about 0.0016 to 0.002 at 10 GHz and low thermal coefficient of dielectric constant ranging from about −21 ppm/° C. to about −33 ppm/° C., respectively, and vowing to these properties, the laminate of the instant disclosure can be exploited for applications beyond 1 GHz.

(b) Properties of PTFE-YTaO$_4$ Laminates

Laminates of polytetrafluoroethylene, YTaO$_4$ and alkali free microfiber glass fiber are made based on the process as described in example-2.

During the process of preparation, weight percent of the filler is varied and dielectric properties are studied with respect to the filler loading. Sample A is prepared by blending 17.5 g of H71 grade PTFE with 31.5 g of YTaO$_4$ and 1 g of microfiber glass. The constituents are mixed well and circuit laminates are realized through SMECH process as described in example-2. The same process is repeated with 32.5 g of YTaO$_4$, 16.5 g of PTFE and 33.5 g of YSmTaO$_4$, 15.5 gm of PTFE for samples B and C, respectively, while keeping the weight of glass fiber as 1 g.

The microwave dielectric properties of the laminated composite substrates are measured in the X-band region using waveguide cavity perturbation technique and results are compiled in Table 2.

TABLE 3

Microwave dielectric properties of PTFE/YTaO$_4$/-E-glass fiber composite system

| Sample | K | tanδ | TCK (ppm/° C.) |
|---|---|---|---|
| A | 4.6 | 0.0015 | −18 |
| B | 4.4 | 0.0017 | −26 |
| C | 4.3 | 0.0020 | −29 |

The above table 3 illustrates that different samples of PTFE/YTaO$_4$ composites exhibit excellent dielectric constant ranging from about 4 to about 5, loss tangent ranging from about 0.0015 to about 0.0020 at 10 GHz and thermal coefficient of dielectric constant values −18 ppm/° C. to about −29 ppm/° C., respectively, and vowing to these properties, the laminate of the instant disclosure can be exploited for applications beyond 10 GHz Example 4

Measurement and Comparison of Dielectric Properties

The ceramic fillers and the laminates prepared from the said fillers provide for superior properties which are compared against commercially available microwave substrates.

TABLE 4

Comparison of dielectric properties of commercially available microwave substrates and that of present invention

| Composite system | Dielectric constant ($\varepsilon_r$) at 10 GHz | Loss tangent (tan δ) at 10 GHz | Temperature coefficient of dielectric constant ($\tau_{\varepsilon_r}$) (ppm/° C.) |
|---|---|---|---|
| RF-43 Taconics, USA | 4.3 | 0.0045 | Data not available |
| AD430 Arlon, USA | 4.3 | 0.003 | −55 |
| Fluoropolymer-Filler laminate of present disclosure | 4.3 | 0.0016 | −21 |

As observed in table 4, the laminate of the instant disclosure has a very low loss tangent (0.0016) at 10 GHz when compared to the laminates of the prior art (RF-43 Taconics, USA and AD430 Arlon, USA), wherein loss tangent is an important criteria in assessing the laminates, as they indicate the efficiency of the laminate by describing the storage and power handling capability within the laminate. Further, the laminate of the instant disclosure is able to exhibit the desired property such as low dielectric constant (4.3), low loss tangent at 10 GHz (0.0016) with low (−21 ppm/C) temperature coefficient of dielectric constant due to the combination of ceramic filler prepared by the instant disclosure, fluoropolymer matrix and microglass fibre, optionally along with additives.

Figure 6:
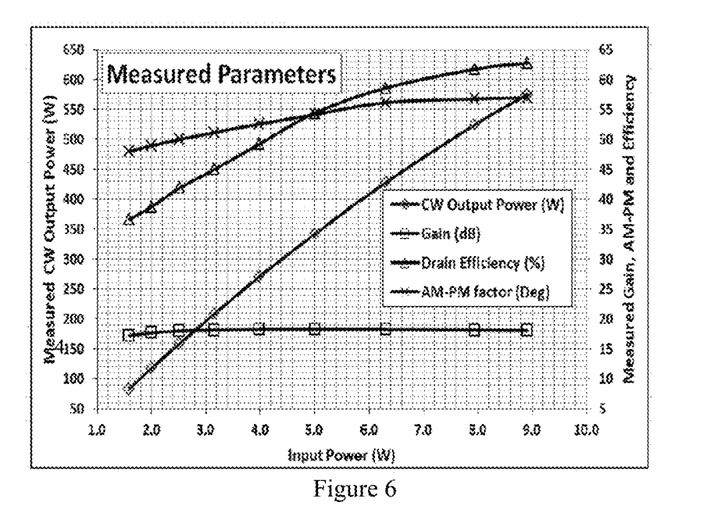
FIG. 6 illustrates the RF performance of the high power solid state amplifier comprising YTaO$_4$ filled PTFE laminates.
Figure 7:
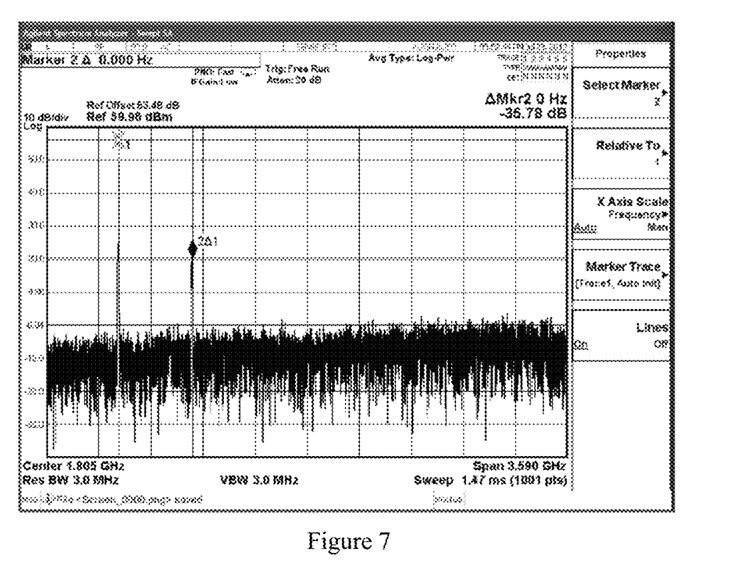
FIG. 7 illustrates the response of high power solid state amplifier comprising YTaO$_4$ filled PTFE laminates at 500 W output power.

In another embodiment, to prove the efficacy of microwave circuit boards prepared from the laminates of instant disclosure, a high power solid state amplifier is fabricated using YTaO$_4$ filled PTFE laminates Cu-cladded on both sides at an operating frequency of 506.8 GHz. The high power solid state amplifiers fabricated using FR-4 boards burned at an output power of 150 W, whereas the same fabricated using ultra low loss microwave laminate developed in the present disclosure worked up to an output power of 540 W without any problem. The performance and response of the said high power solid state amplifier comprising YTaO$_4$ filled PTFE laminate is illustrated in FIGS. 6 and 7, respectively.

In conclusion, the present disclosure describes fluoropolymer-filler substrate materials having desired properties of low dielectric constant and low loss tangent. The composite substrates/laminates comprising fluoropolymer and specific filler materials are prepared through Sigma Mixing, Extrusion, Calendering and Hot pressing (SMECH) processes. The flexible laminate thus obtained have low dielectric constants of about 4.2 to about 4.7, dielectric loss of about 0.0016 to about 0.0022 and temperature coefficient of dielectric constant of about −18 ppm/° C. to −71 ppm/° C. Printed circuit board comprising these laminates exhibit improved electrical and microwave performances in terms of dielectric constant, loss and temperature coefficient of dielectric constant over existing substrate materials, which are suitable for high frequency and high power applications.

We claim:

1. A composition consisting of a fluoropolymer and a ceramic filler, optionally along with glass fibre or industrially acceptable additive, wherein the ceramic filler is represented by a formula $M'_{1-x}M''_xTaO_4$;

wherein, M' and M'' is individually a metal selected from a group comprising aluminum (Al), yttrium (Y), lanthanum (La), praseodymium (Pr), europium (Eu), gadolinium (Gd), terbium (Tb), samarium (Sm) and ytterbium (Yb) or any combination thereof;

Ta is tantalum;

O$_4$ is derived from a stoichiometric combination of oxides of M', M'' and Tantalum; and x is any number ranging from 0 to 1 including 0 and 1.

2. The composition as claimed in claim 1, wherein the fluoropolymer is selected from a group consisting of polytetrafluoroethylene (PTFE) and any copolymer made of hexafluoropropene (HFP), tetrafluoroethylene (TFE), or perfluoroalkylvinyl ether (PAVE), or any combination thereof; and wherein the glass fibre is selected from a group comprising microglass fibre, alkali free E-glass fibre and alkali free S-glass fibre, or any combination thereof.

3. The composition as claimed in claim 1, wherein the ceramic filler is at a concentration ranging from about 30 volume % to about 60 volume %; the fluoropolymer is at a concentration ranging from about 30 volume % to about 50 volume %; and the glass fibre is at a concentration ranging from about 2 volume % to about 6 volume %.

4. The composition as claimed in claim 1, wherein the composition has a dielectric constant of about 4 to about 4.5, dielectric loss of about 0.0016 to about 0.002 with a temperature coefficient of dielectric constant of about −30 ppm/° C. to about −100 ppm/° C.

5. A method of preparing a composition consisting of a fluoropolymer and a ceramic filler, optionally along with glass fibre, wherein the ceramic filler is represented by a formula $M'_{1-x}M''_xTaO_4$;

wherein, M' and M'' is individually a metal selected from a group comprising aluminum (Al), yttrium (Y), lanthanum (La), praseodymium (Pr), europium (Eu), gadolinium (Gd), terbium (Tb), samarium (Sm) and ytterbium (Yb) or any combination thereof;

Ta is a tantalum;

O$_4$ is derived from a stoichiometric combination of oxides M', M'' and Tantalum; and x is any number ranging from 0 to 1, including 0 and 1, said method comprising act of mixing the fluoropolymer and the ceramic filler, optionally along with the glass fibre to obtain the composition.

6. The method as claimed in claim 5, wherein the mixing is sigma mixing; and wherein the mixing is carried out in a sigma mixer having a counter rotating blade rotating at speed ranging from about 80 rpm to about 120 rpm and for time-period ranging from about 1 hour to about 2 hours.

7. The method as claimed in claim 5, wherein the mixing optionally comprises adding a lubricant; and wherein the lubricant is selected from a group comprising dipropylene glycol, diethylene glycol, poly propylene glycol and paraffin oil, or any combination thereof.

8. The method as claimed in claim 5, wherein the composition obtained is further subjected to acts of extruding, calendering and hot pressing to obtain a laminate.

9. The method as claimed in claim 8, wherein the extrusion is carried out with a ram extruder at pressure ranging from about 110 kg/cm$^2$ to about 170 kg/cm$^2$, the calendering is carried out by passing the composition between rollers at speed ranging from about 20 rpm to about 60 rpm, and the hot pressing is carried out in a die at temperature ranging from about 330° C. to about 380° C., pressure ranging from about 110 kg/cm$^2$ to about 180 kg/cm$^2$ and for time period ranging from about 8 hours to about 20 hours.

* * * * *